(12) United States Patent
Bahadur Thapa et al.

(10) Patent No.: US 10,563,553 B2
(45) Date of Patent: Feb. 18, 2020

(54) SYSTEM AND METHOD FOR REDUCING THE AMOUNT OF SULFUR OXIDES IN EXHAUST GAS

(71) Applicant: YARA MARINE TECHNOLOGIES AS, Oslo (NO)

(72) Inventors: Shyam Bahadur Thapa, Oslo (NO); Peter Strandberg, Oslo (NO)

(73) Assignee: Yara Marine Technologies AS, Oslo (NO)

(*) Notice: Subject to any disclaimer, the term of this patent is extended or adjusted under 35 U.S.C. 154(b) by 0 days.

(21) Appl. No.: 16/078,066

(22) PCT Filed: Jun. 23, 2017

(86) PCT No.: PCT/EP2017/065484
§ 371 (c)(1),
(2) Date: Aug. 21, 2018

(87) PCT Pub. No.: WO2017/220759
PCT Pub. Date: Dec. 28, 2017

(65) Prior Publication Data
US 2019/0107021 A1    Apr. 11, 2019

(30) Foreign Application Priority Data
Jun. 23, 2016   (EP) ..................................... 16176030

(51) Int. Cl.
*F01N 3/04*     (2006.01)
*F01N 13/00*    (2010.01)
(Continued)

(52) U.S. Cl.
CPC ........... *F01N 3/04* (2013.01); *B01D 53/1481* (2013.01); *B01D 53/185* (2013.01);
(Continued)

(58) Field of Classification Search
CPC ....................... B01D 53/1481; B01D 53/1456; B01D 53/50; B01D 53/504; B01D 53/79;
(Continued)

(56) References Cited

U.S. PATENT DOCUMENTS 6,644,024 B1 * 11/2003 Powers ...................... F01N 3/04
60/298
2009/0049986 A1    2/2009 Kaisko et al.
(Continued)

FOREIGN PATENT DOCUMENTS

EP         3450715 A1 *  3/2019    ............ F01N 13/011
JP       2012180772 A    9/2012
(Continued)

OTHER PUBLICATIONS

PCT International Search Report and Written Opinion dated Sep. 25, 2017 for PCT International Patent Application No. PCT/EP2017/065484, 11 pages.
(Continued)

*Primary Examiner* — Timothy C Vanoy
(74) *Attorney, Agent, or Firm* — Amster, Rothstein & Ebenstein LLP

(57) ABSTRACT

The present application relates to a spray tower for cleaning the exhaust gas from marine engines, wherein the spray tower, in installed position, is vertically positioned and comprises a central exhaust gas pipe for introducing exhaust gas into the spray tower through an exhaust gas inlet positioned at a proximal end of the central exhaust gas pipe, the central exhaust gas pipe being positioned at a bottom end of the spray tower, an exhaust gas outlet at a top end of the spray tower for withdrawing purified exhaust gas from the spray tower, one or more spray devices for providing scrubber liquid within the spray tower counter-current to the general exhaust gas flow, and at least two engine exhaust gas (Continued)

pipes being in fluid connection with the distal end of the central exhaust gas pipe. Furthermore, a method for reducing the amount of SOx in exhaust gas is described.

16 Claims, 6 Drawing Sheets

(51) Int. Cl.
B01D 53/14 (2006.01)
B01D 53/18 (2006.01)
B01D 53/50 (2006.01)
B01D 53/78 (2006.01)
(52) U.S. Cl.
CPC ........... *B01D 53/504* (2013.01); *B01D 53/78* (2013.01); *F01N 13/004* (2013.01); *B01D 2251/402* (2013.01); *B01D 2251/602* (2013.01); *B01D 2251/604* (2013.01); *B01D 2252/1035* (2013.01); *B01D 2257/302* (2013.01); *B01D 2259/4566* (2013.01); *F01N 2590/02* (2013.01)
(58) Field of Classification Search
CPC ................ B01D 53/92; B01D 2221/08; B01D 2257/302; B01D 2258/012; B01D 2258/0283; B01D 2259/40; B01D 2259/4566; F01N 2590/02; F01N 3/0807; F01N 3/085; F01N 2570/04; B01J 19/24; B01J 19/26; B01J 2204/00; B01J 2204/002; B01J 2219/0875
See application file for complete search history.

(56) References Cited

U.S. PATENT DOCUMENTS

2013/0228073 A1\* 9/2013 Patterson ............... B01D 47/14
                                                        95/187
2016/0016109 A1   1/2016 Strandberg
2019/0232222 A1\* 8/2019 Hayata .................. B01D 53/88

FOREIGN PATENT DOCUMENTS

| KR | 1940604 B1 \* | 1/2019 | ............ F01N 3/037 |
| WO | 2006048506 A1 | 5/2006 | |
| WO | WO 2012 054448 A3 \* | 8/2012 | ............ F01N 3/0211 |
| WO | 2013105862 A1 | 7/2013 | |
| WO | 2017194645 A1 | 11/2017 | |

OTHER PUBLICATIONS

PCT Written Opinion of the International Preliminary Examining Authority dated May 17, 2018 for PCT International Patent Application No. PCT/EP2017/065484, 7 pages.
"ABS Advisory on Exhaust Gas Scrubber Systems," American Bureau of Shipping, published Mar. 22, 2013, 48 pages.
PCT International Preliminary Report on Patentability dated Oct. 17, 2018 for PCT International Patent Application No. PCT/EP2017/065484, 13 pages.

\* cited by examiner ized SYSTEM AND METHOD FOR REDUCING THE AMOUNT OF SULFUR OXIDES IN EXHAUST GAS

CROSS-REFERENCE TO RELATED APPLICATIONS

This application is a U.S. national stage entry under 35 U.S.C. § 371 of PCT International Patent Application No. PCT/EP2017/065484, filed Jun. 23, 2017, which claims priority to European Patent Application No. 16176030.1, filed Jun. 23, 2016, the contents of which are incorporated herein by reference in their entirety.

TECHNICAL FIELD

The present application relates to the technical field of exhaust gas cleaning. More specifically, the application relates to cleaning of marine exhaust gas by reducing the content of sulfur oxides ($SO_x$) in this marine exhaust gas using wet scrubbing.

BACKGROUND

Fossil fuel combustion is used in industrial processes for many different purposes. Unfortunately, fossil fuel combustion produces several contaminants, which have been found to be detrimental to the environment. In particular, sulfur and nitrogen oxide compounds are the major components of "acid rain". Sulfur is a naturally occurring element in crude oil, concentrated in the residual components of the crude oil distillation process. The amount of sulfur in the fuel oil depends mainly on the source of crude oil, and to a lesser extent on the refining process. Typically for fuel on a worldwide basis, the value is in the order of 1.5-4% w/w. These values lead to high concentration of $SO_2$ in flue gases. For example, when using a fuel containing 1.5% w/w sulfur, the concentration of $SO_2$ in the emitted gas is about 630 ppm, and with a fuel containing 4% w/w sulfur, the concentration of $SO_2$ in the emitted gas is about 1700 ppm.

In recognition of the harm caused by sulfur oxides ($SO_x$) and nitrogen oxides ($NO_x$), different combustion gas cleaning processes and separation technologies have been developed to remove these components of combustion flue gases prior to release of the flue gases into the atmosphere, especially since the burning of fossil fuel releases many millions of tons of $SO_2$ every year.

European waters were the first in the world to introduce more stringent sulfur emission regulations for ships, with the coming into force of so-called Sulfur Emission Control Areas (SECAs) in the Baltic Sea in 2006, followed by the North Sea and English Channel in 2007.

Under the European Union (EU) Marine Sulfur Directive, only low-sulfur fuels of less than 1.5% w/w sulfur are permitted. Furthermore, a 1.5% w/w sulfur cap in fuel applies to fuels used by passenger vessels operating regular services to and from any community port from Aug. 11, 2006, and not just in SECAs. The EU legislation allows the use of technologies that abate the sulfur content in the emitted gas as an alternative to using low-sulfur fuels (of 1.5% w/w sulfur). Thus, the technology should assure reductions in sulfur emissions that are at least equal to, or better, than those achieved by lowering the sulfur content in bunker fuel.

Most of the technologies for reducing the content of $SO_x$ in the exhaust gas use wet scrubbing processes in which the exhaust gas is contacted with an aqueous solution. The aim of these processes is to provide high absorption efficiencies, i.e., above 70-95% $SO_2$ absorption. The demands relating to an absorption process are high, leading to relatively few design options. For example, the efficiency of the reaction between the components in the aqueous solution and the $SO_x$ in the exhaust gas phase being treated decreases as the reaction temperature increases, especially above about 70° C. However, the temperature of the emitted gas is about 300° C. thereby diminishing the efficiency of the process.

In addition, the volume of the emitted exhaust gas is significant, reaching an output of about 12000 $m^3$/hr for a relatively small engine with a capacity of about 1 MW. Thus a high efficiency process is required in order to avoid the dependence on large equipment to process the large volume of gas. Equipment size is particularly critical on board of ships where the available space is limited.

Purification of exhaust gas from marine vessels by wet scrubbing is well known. US2016016109, for example, discloses a vertical scrubber tower with an upper and lower chamber, each with water injectors, deflection bodies and a scrubber liquid outlet.

EP1857169 discloses a scrubbing system based on fresh water comprising a sulfur removal agent in a packed bed scrubber. Packed beds in scrubbers often generate high backpressure to the engine. This problem can be solved by introducing an exhaust fan after the scrubber. Packed bed scrubbers also require a bypass-system because the packed bed can be damaged during dry running. Furthermore, the packed bed scrubbers are required to have silencer systems and operate with fresh water only.

Scrubbers for power stations comprising a plurality of diesel engines are also known. WO2006048506 for example, discloses how engine exhaust gases from multiple engines are arranged to be conveyed in separate pipes all the way to the scrubber.

It is emphasized that, although scrubber technology suitable for land based installations is already known, these technologies are not always suitable for marine applications since the size, the weight, the robustness, the stability, the flow and the exhaust composition are parameters that are not automatically interchangeable between a marine and a land based scrubber system.

The purpose of the application is to provide a scrubbing system not creating a high backpressure to the engine and at the same time allowing a multiplicity of engine exhaust gas pipes to be connected to the scrubber tower in a simple way and requiring a limited amount of space.

SUMMARY

According to a first aspect of the present application, a system for reducing the amount of $SO_x$ in exhaust gases is disclosed, comprising
a) a spray tower arranged to be vertically positioned and having an inner space, wherein the spray tower comprises,
  (1) a central exhaust gas pipe arranged for introducing exhaust gas into the inner space of the spray tower through an exhaust gas inlet positioned at a proximal end of the central exhaust gas pipe, the central exhaust gas pipe being positioned at a bottom end of the spray tower in installed position, the central exhaust gas pipe being in fluid connection with the inner space of the spray tower through an exhaust gas inlet at a top end of the central exhaust gas pipe; and
  (2) at least one exhaust gas outlet arranged for withdrawing purified exhaust gas from the inner space of the spray tower, the exhaust gas outlet being positioned at a top end of the spray tower in installed position, the exhaust gas outlet being in fluid connection with the inner space of the spray tower, wherein from the exhaust gas inlet to the exhaust gas outlet, a general exhaust gas flow is passing through the inner space of the spray tower;

b) one or more spray devices configured to provide a stream of scrubber liquid within the inner space of the spray tower counter current to the general exhaust gas flow;

c) at least two engine exhaust gas pipes being in fluid connection with the distal end of the central exhaust gas pipe.

Thus, a system for reducing the amount of $SO_x$ in exhaust gas from marine engines is provided, the system comprising a) a spray tower arranged to be vertically positioned and having an inner space, wherein the spray tower comprises,
  1) a central exhaust gas pipe arranged for introducing exhaust gas into and in fluid connection with the inner space of the spray tower through an exhaust gas inlet positioned at a proximal end of the central exhaust gas pipe, wherein said central exhaust gas pipe is positioned at a bottom end of the spray tower in installed position; and
  (2) at least one exhaust gas outlet arranged for withdrawing purified exhaust gas from, and in fluid connection with, the inner space of the spray tower, wherein said exhaust gas outlet is positioned at a top end of the spray tower in installed position,
  wherein from the exhaust gas inlet to the exhaust gas outlet, a general exhaust gas flow is passing through the inner space of the spray tower; and
  (3) at least one scrubber liquid outlet arranged to drain off the scrubber liquid out from the spray tower;

b) one or more spray devices configured to provide a stream of scrubber liquid within the inner space of the spray tower counter current to the general exhaust gas flow;

c) at least two engine exhaust gas pipes being in fluid connection with the distal end of the central exhaust gas pipe.

Spray towers are low energy scrubber towers. They are in general longer towers than for instance packed bed scrubber towers so that a similar residence time for the gas and liquid to gas ratio as packed bed scrubber towers is obtained. The main advantage of spray towers is their open design. An open design means that there are no internal parts in the inner space of the scrubber tower except from the spray devices, more in particular spray nozzles, which are arranged for spraying scrubber liquid into the inner space of the spray tower. A spray nozzle is a precision device that facilitates dispersion of scrubber liquid into a spray. These types of open type scrubber towers thus do not have a packed bed in the inner space of the scrubber tower. They can however have a demister located at the top end of the spray tower to prevent that the droplets do not leave the spray tower. It is remarked that in this application, a distinction is made between drops and droplets. Drops are scrubber liquid particles with a size sufficient to fall downwards into the spray tower during exhaust purification. The sufficient size will depend on the exhaust flow and the exhaust temperature and can be readily determined by a skilled person. Such drops will fall countercurrent to the general exhaust gas flow. Drops may evaporate to become droplets and/or vapor depending on several parameters like their initial size, the exhaust gas temperature and the exhaust gas flow. Droplets are particles with a size insufficient to fall downwards in the spray tower during exhaust gas purification. Thus, droplets will essentially move along with the general exhaust gas flow. The droplets may however collide with each other and/or with bigger drops, such that the droplets can increase their size to become drops. The injected volume of scrubber liquid can be adjusted according to the engine load to optimize performance of the spray tower. For example, the injected volume of scrubber liquid may be in the range of 10 000 to 15 000 litres per minute for a 10-15 meter high spray tower with a diameter of about 3 meters, when purifying 30 kg exhaust gas per second.

The system according to the present application provides a technical solution with the advantage compared to the prior art systems in that the system according to the present application is very simple and does not require much space for installation. Furthermore, by connecting at least two engine exhaust gas pipes at the bottom end of a central exhaust gas pipe, the exhaust composition entering the spray tower is uniform while the exhaust gas velocity is lowered, thereby facilitating a desired turbulent flow inside the spray tower. Turbulent flow inside the spray tower provides intimate mixing of the exhaust gas and a stream of scrubber liquid for efficient cooling and scrubbing of the exhaust gas to a temperature that allows $SO_x$ to be efficiently dissolved in the scrubber liquid.

Furthermore, the system according to the present application can rely on salt water as scrubber liquid and does not contain a bypass system or a silencer or both, like is for instance necessary when using a packed bed scrubber. In this system, the noise of the exhaust gas can be reduced to meet the comfort rating on a marine vessel. It is for example possible to reduce the noise by 30 dB when operating, but it can also reduce the noise when dry running.

The scrubber liquid or stream of scrubber liquid is more specifically chosen out of fresh water, salt water or an alkaline aqueous solution.

The size of the drops/droplets has the impact into the scrubbing efficiency, i.e. the smaller the droplets, the higher the surface area and the higher the scrubbing efficiency. The spray devices that are used produce different sizes of the drops/droplets. The size of the droplets also needs to be such that they have a size not to fly out of the spray tower together with the purified exhaust gas going out of the exhaust gas outlet and needs to be such that the smaller droplets will be washed down. Therefore, according to an embodiment of the system according to the application, the one or more spray devices are configured to provide scrubber liquid droplets when being in operation, wherein more than 50% of the volume of the droplets have a diameter of 0.35 mm to 4 mm, more specifically 0.5 to 2 mm, most specifically around 1 mm. If the droplet size is smaller than 0.35 mm, a demister present in the spray tower will have difficulties to capture these droplets and they will go along with the purified exhaust gas going out of the spray tower.

According to one embodiment of a system according to the application, all spray devices are arranged to spray the scrubber liquid upwards.

According to another embodiment of a system according to the application, all spray devices are arranged to spray the scrubber liquid downwards.

According to still another embodiment of a system according to the invention, part of the spray devices are arranged to spray the scrubber liquid upwards and part of the spray devices are arranged to spray the scrubber liquid downwards.

By directing at least a part of the injected scrubber liquid in parallel to the general exhaust gas flow, i.e. upwards, the injected scrubber liquid assists in driving the exhaust gas upwards, and thus reduces the pressure drop in the spray tower compared to a situation where all scrubber liquid is sprayed downwards in the spray tower. When a spray device is arranged to spray the scrubber liquid in an upward direction, the center of the spraying direction is considered to be parallel along the general exhaust gas flow. When a spray device is arranged to spray the scrubber liquid in a downward direction, the center of the spraying direction is considered to be countercurrent the general exhaust gas flow.

In an embodiment of a system according to the application, the central exhaust gas pipe passes through the bottom end of the spray tower and extends into the inner space of the spray tower, and the spray tower further comprises at least one scrubber liquid outlet arranged to drain off the scrubber liquid out from the spray tower, the scrubber liquid outlet being positioned below the proximal end of the central exhaust gas pipe. When the central exhaust gas pipe is passing through the bottom end of the spray tower and extending into the inner space of the spray tower, the liquid scrubber outlet can easily be connected to the bottom end of the spray tower through which a very efficient draining off of the used scrubber liquid out of the inner of the spray tower is obtained.

In an embodiment of a system according to the application, the spray tower comprises at least one deflection body to reduce or prevent the used scrubber liquid from entering the central exhaust gas pipe. These deflection bodies further have the effect that they redirect the flow of the exhaust gas to cause optimal scrubbing conditions and mixing of the exhaust gas and scrubbing liquid in the inner space of the spray tower.

In an embodiment of a system according to the application, the system comprises a single spray tower. The presence of a single spray tower has as an advantage that there is a low backpressure, thus it obviates the need for an exhaust gas fan.

In a possible embodiment of a system according to the application, each of the engine exhaust gas pipes comprise an exhaust gas valve arranged to prevent backflow of the exhaust gas when the exhaust gas valve is closed.

In embodiment particular embodiment of the application, each of the engine exhaust gas pipes is connected to a separate engine to convey the exhaust gas from each of the single engines to the central exhaust gas pipe.

According to an embodiment of a system according to the invention, the spray tower comprises an upper and a lower scrubber chamber fluidly connected to each other, wherein
a) both scrubber chambers comprise at least one spray device configured to provide a stream of scrubber liquid counter current to the general exhaust gas flow through each of the scrubber chambers;
b) the upper scrubber chamber comprises at least one deflection body located below the spray device situated lowest in the upper scrubber chamber, and configured to prevent scrubber liquid from entering the lower scrubber chamber;
c) the upper scrubber chamber comprises at least one scrubber liquid outlet arranged to drain off used scrubber liquid out of the upper scrubber chamber;
d) the lower scrubber chamber comprises at least one deflection body located below the spray device situated lowest in the lower scrubber chamber, and configured to prevent scrubber liquid from entering the central exhaust gas pipe;
e) the lower scrubber chamber comprises at least one scrubber liquid outlet arranged to drain off used scrubber liquid out of the lower scrubber chamber.

More particularly, the spray devices in the upper scrubber chamber are arranged to spray scrubber liquid downwards and the spray devices in the lower chambers are directed to spray scrubber liquid upwards.

According to an embodiment of the application, the central exhaust gas pipe can be essentially coaxially arranged through the bottom end of the spray tower. The cross section of the central exhaust gas pipe can be smaller than the cross section of the remainder of the spray tower itself. This reduces the exhaust velocity in the spray tower compared to the central exhaust pipe, which may allow sufficient exhaust retention time in the spray tower. A low, but still net positive, exhaust velocity inside the spray tower allows the backpressure over the spray tower to be kept as low as possible. Higher backpressures may result in the engines having to work harder and being less efficient and using more fuel.

According to a second aspect of the present application, a method for purifying exhaust gas from at least two engines, preferably located in a marine vessel, by reducing the amount of $SO_x$ in the exhaust gas the method comprising the steps of:
a) conveying exhaust gas from the engines via two or more engine exhaust gas pipes to a central exhaust gas pipe arranged for introducing exhaust gas into the inner space of a spray tower through an exhaust gas inlet positioned at the proximal end of the central exhaust gas pipe, the central exhaust gas pipe being located at a bottom end of a vertically positioned spray tower, the two or more engine exhaust gas pipes being arranged for introducing exhaust gas into the distal end of the central exhaust gas pipe;
b) generating a general exhaust gas flow from the exhaust gas inlet to an exhaust gas outlet, for withdrawing purified exhaust gas out from the spray tower, located at an top end of the spray tower,
c) injecting scrubber liquid into the spray tower using one or more spray devices, thereby providing a stream of scrubber liquid counter current to the general exhaust gas flow.

The method according to the application further comprises the draining off of used scrubber liquid out of the spray tower via at least one scrubber liquid outlet.

The at least two engines more specifically are located in a marine vessel.

In a possible method according to the application, the scrubber liquid is fresh water.

In another possible method according to the application, the scrubber liquid is salt water.

In still another possible method according to the application, the scrubber liquid is an alkaline aqueous solution.

In a method according to the application, more than 50% of the volume of scrubber liquid drops in the spray have a diameter of 4 mm or less.

More specifically, more than 50% of the volume of the scrubber liquid drops in the spray have a diameter of 2 mm or less.

In a particular method according to the application, a system according to the application as described above is used.

DETAILED DESCRIPTION

Figure 1:
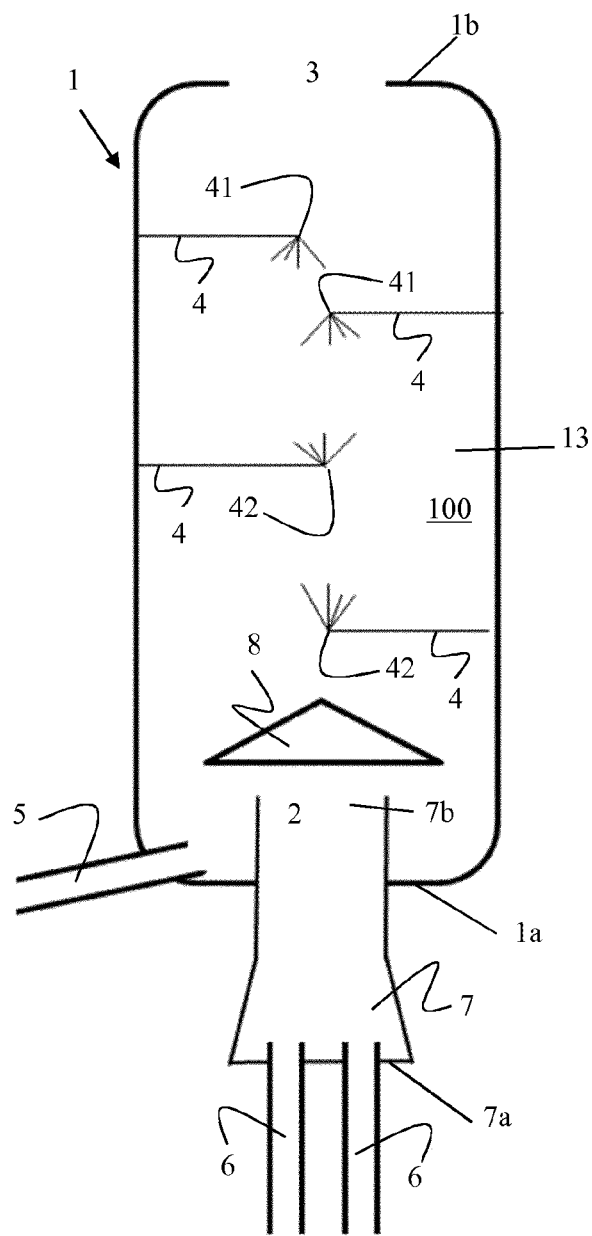
FIG. 1 shows a simplified representation of a longitudinal section of a system according to the application comprising a vertically placed spray tower that is provided with a central exhaust gas pipe located at and penetrating the bottom end of the spray tower, in which two engine exhaust gas pipes are penetrating the bottom end of the central exhaust gas pipe and in which the spray tower comprises 2 spray devices spraying scrubber liquid upwards and two spray devices spraying scrubber liquid downwards in the spray tower.

The different embodiments of a system according to the application, as shown in FIGS. 1 to 5, all comprise a spray tower (1) for removing $SO_x$ out of an exhaust gas produced by engines (not shown on the figures), more specifically marine engines, that is arranged to be essentially vertically positioned. In its simplest form, the spray tower (1) consists of a cylinder having an inner space (100). The spray tower (1) further has a bottom end (1a) and a top end (1b) in the installed position thereof. The bottom end (1a) more in particular lies at the opposite side of the top end (1b) of the spray tower (1). The cylinder more specifically has a rotational symmetry about a common length axis. It is convenient to have an exhaust gas outlet (3) coaxially arranged through the upper end (1b) of the spray tower (1). At the bottom end (1a) of the spray tower (1), a central exhaust gas pipe (7) is located. This central exhaust gas pipe (7) has an open proximal end (7b) defining an exhaust gas inlet (2) and a partially closed off distal end (7a). The distal end (7a) of the central exhaust gas pipe (7) more in particular is located at the opposite side of the proximal end (7b) of the central exhaust gas pipe (7). The central exhaust gas pipe (7) is in fluid connection with the inner space (100) of the spray tower (1). The central exhaust gas pipe (7) more specifically passes through the bottom end (1a) of the spray tower (1) and extends in the inner space (100) of the spray tower (1). The cross section of the central exhaust gas pipe (7) can have any shape. It is however advantageous to have a circular or oval cross-section. If the cross section of the central exhaust gas pipe (7) has the shape of a polygon with angles between adjacent walls, especially right and sharp angles, the flow properties could be negatively affected.

At the distal end (7a) of the central exhaust gas pipe (7), at least two engine exhaust gas pipes (6), that are fluidly connected with the engines expelling the exhaust gas, are connected to the spray tower (1). These engine exhaust gas pipes (6) are thus arranged to convey the exhaust gas generated by the engines to the spray tower (1) via the central exhaust gas pipe (7). The engine exhaust gas pipes (6) more specifically passes through the distal end (7a) of the central exhaust gas pipe (7) and thus extend into the inner space (100) of the spray tower (1). It is however also possible that they are in connection with the distal end (7a) of the central exhaust gas pipe (7) without passing through this distal end (7a). By connecting the engine exhaust gas pipes (6) to the central exhaust gas pipe (7), the flow rate of the exhaust gas in the spray tower (1) is lowered and can facilitate a desired turbulent flow of the exhaust gas throughout the spray tower (1).

Figure 3:
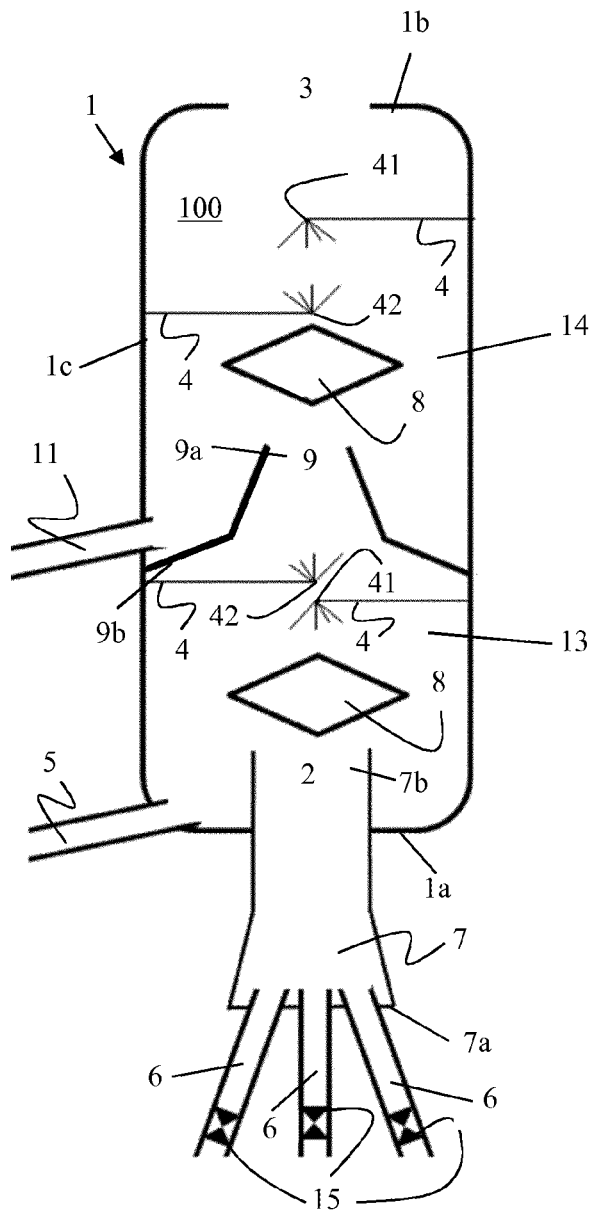
FIG. 3 shows a simplified representation of a longitudinal section of a scrubber system, comprising a vertically positioned spray tower with an upper and a lower scrubber chamber, in which the lower scrubber chamber comprises a central exhaust gas pipe located at and penetrating the bottom end of the spray tower, in which three engine exhaust gas pipes that are penetrating the bottom end of the central exhaust gas pipe and that are placed under an angle versus the bottom end, and in which the lower and the upper scrubber chamber are provided with two spray devices of which one is arranged to spray scrubber liquid in an upward direction and one is arranged to spray scrubber liquid in a downward direction.
Figure 4:
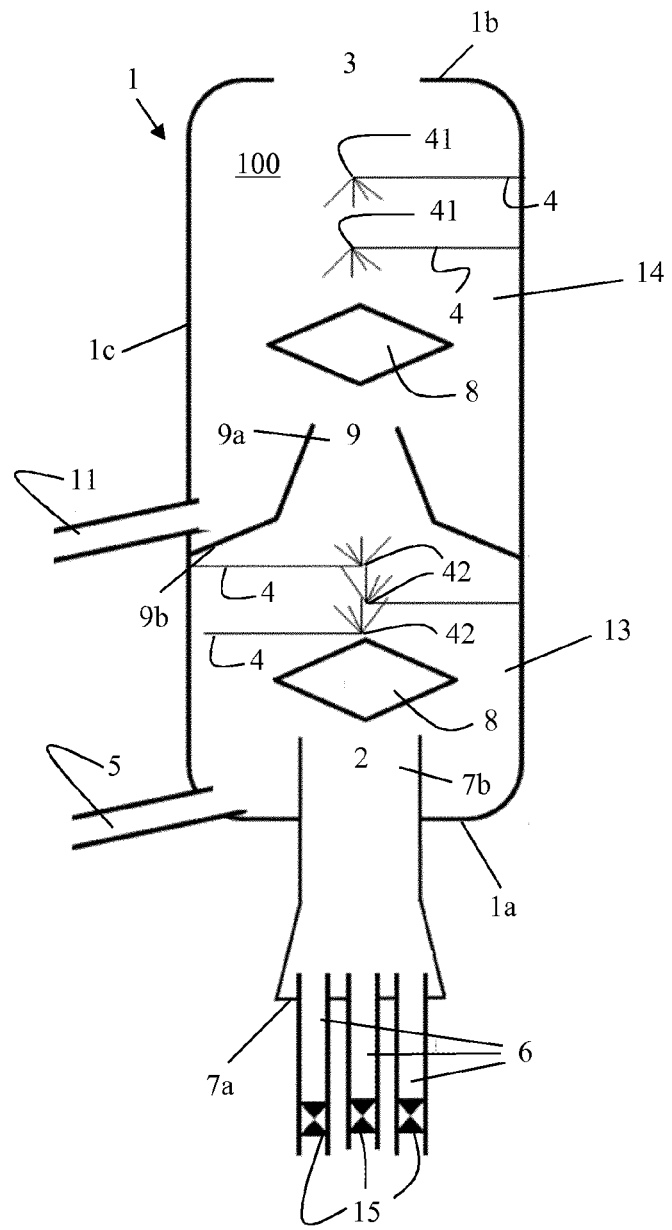
FIG. 4 shows a simplified representation of a longitudinal section of a scrubber system, comprising a vertically positioned spray tower with an upper and a lower scrubber chamber, in which the lower scrubber chamber comprises a central exhaust gas pipe located at and penetrating the bottom end of the spray tower, in which three vertically positioned engine exhaust gas pipes are penetrating the bottom end of the central exhaust gas pipe, and in which the lower scrubber chamber is provided with three spray devices that are arranged to spray scrubber liquid in an upward direction and the upper scrubber chamber is provided with two spray devices that are arranged to spray scrubber liquid in a downward direction.
Figure 5:
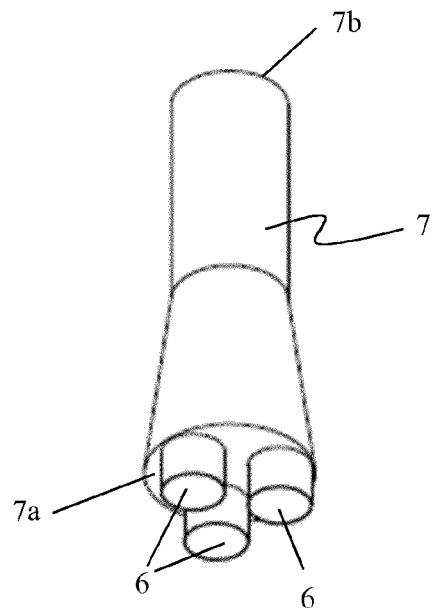
FIG. 5 shows a 3D view of three engine exhaust gas pipes that are connected with the bottom end of a central exhaust gas pipe.

This central exhaust gas pipe (7) allows connecting more than two engines to the spray tower (1). More in particular, it is also possible to connect 3, 4, 5 or 6 engines to the central exhaust gas pipe (7). It is possible to connect one engine to one engine exhaust gas pipe (6). Consequently, it is possible to connect 3, 4, 5 or 6 engines to the central exhaust gas pipe (7) via 3, 4, 5 or 6 engine exhaust gas pipes (6). In FIGS. 3 to 5, 3 engine exhaust gas pipes (6) are connected to the central exhaust gas pipe (7) allowing three engines to be connected to the spray tower (1) via the 3 engine exhaust gas pipes (6) that are in their turn connected to the central exhaust gas pipe (7).

Backflow of exhaust gas to an engine which is not in operation, e.g. due to maintenance, can be avoided by an exhaust gas valve (15) in each of the engine exhaust gas pipes (6) (as shown in FIGS. 3 and 4).

Figure 2:
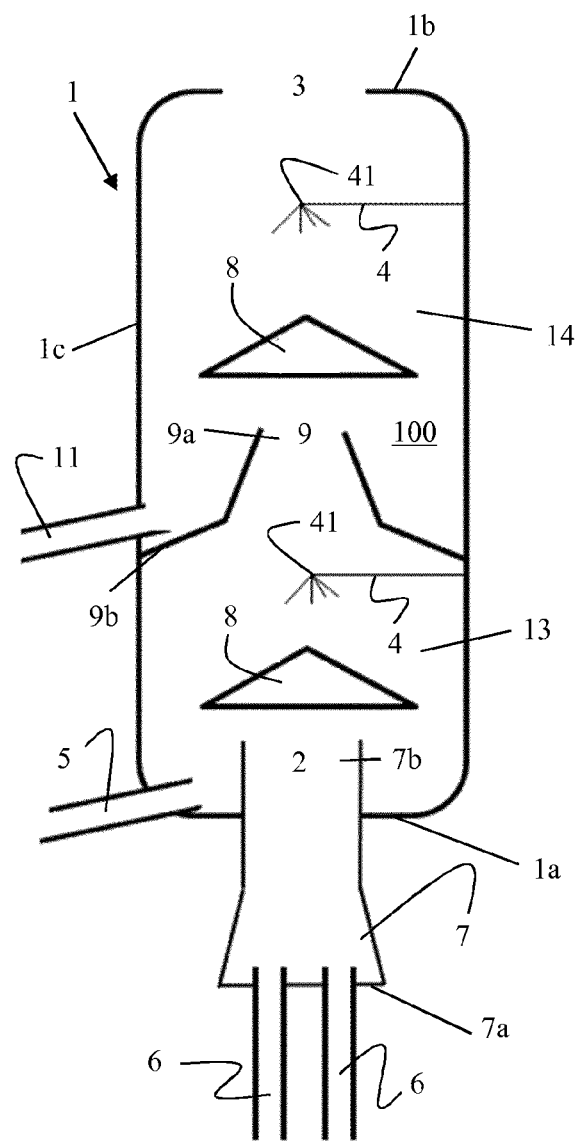
FIG. 2 shows a simplified representation of a longitudinal section of a system according to the application comprising a vertically positioned spray tower with a lower and an upper scrubber chamber, in which the lower scrubber chamber comprises a central exhaust gas pipe located at and penetrating the bottom end of the spray tower, in which two engine exhaust gas pipes are penetrating the bottom end of the central exhaust gas pipe, and in which the lower and the upper scrubber chamber are provided with a spraying nozzle that is arranged to spray scrubber liquid in a downward direction.

The engine exhaust gas pipes (6) can be positioned essentially vertical, as shown in FIGS. 2 and 4. This set-up will have the lowest backpressure. However, when exhaust gas valves (15) are provided in the engine exhaust gas pipes (6), there has to be space to fit these exhaust gas valves (15), through which in most cases, the engine exhaust gas pipes (6) are to be placed under an angle versus the distal end (7a) of the central exhaust gas pipe (7) and diverting away from each other starting at the distal end (7a), as can be seen in FIG. 3, resulting in a slightly higher backpressure.

In the spray tower (1), a general exhaust gas flow moves throughout the spray tower (1) from the exhaust gas inlet (2) to the exhaust gas outlet (3) and comes therewith into contact with a stream of scrubber liquid that is moving counter current to the general exhaust gas flow. As used herein, the general exhaust gas flow is the average direction by which the exhaust gas moves throughout the spray tower (1). Even if the exhaust gas flow is turbulent, and in local areas may move in any direction, the general exhaust gas flow in general occurs upwards in the vertically placed spray tower (1) from the exhaust gas inlet (2) to the to the exhaust gas outlet (3).

In order to produce a stream of scrubber liquid counter current to the general exhaust gas flow in order to scrub the exhaust gas flow to remove the $SO_x$, one or more spray devices are provided in the inner space (100) of the spray tower (1). There exist spray devices (41) that are arranged to spray scrubber liquid in a downward direction and spray devices (42) that are arranged to spray scrubber liquid in an upward direction. The spray devices (41, 42) are more in particular in the form of spray nozzles (41, 42). A spray nozzle (41, 42) is more specifically mounted on an injector line (4), typically at the end thereof, and directed in an upward, respectively a downward direction to spray the scrubber liquid in an upward, respectively a downward direction. It is possible to arrange all spray devices (41) in the spray tower (1) to spray scrubber liquid in a downward direction (as shown in FIG. 2), as well to arrange all spray devices (42) to spray scrubber liquid in an upward direction (not shown in the figures). It is however also possible to provide a number of spray devices (41) to spray scrubber liquid in a downward direction and to provide a number of spray devices (42) to spray scrubber liquid in an upward direction (as shown in FIGS. 1, 3 and 4).

The spray devices (41, 42) create falling scrubber liquid droplets (not shown on the figure). The stream of scrubber liquid may be any aqueous liquid or aqueous solution including, but not limited to, fresh water, salt water and an alkaline aqueous solution. For marine vessels, the stream of scrubber liquid may conveniently be salt water, in particular sea water. Addition of an alkaline aqueous solution comprising dissolved MgO or $Mg(OH)_2$ to the scrubber liquid can increase the $SO_x$ absorption capacity. Such increase in capacity is especially important if the scrubber liquid is recycled back into the spray tower (closed loop system). This is because the absorption of $SO_x$ will reduce the pH of and thus reduce the capacity to further absorb additional $SO_x$ contaminants.

Figure 6A:
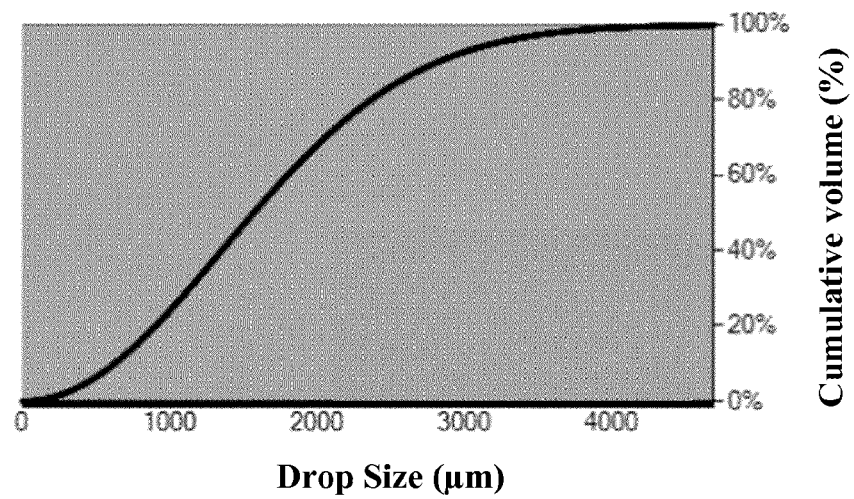
FIG. 6a shows the drop size distribution from a spiral spray device injecting 2180 liters water/minute at 2 bar pressure.
Figure 6B:
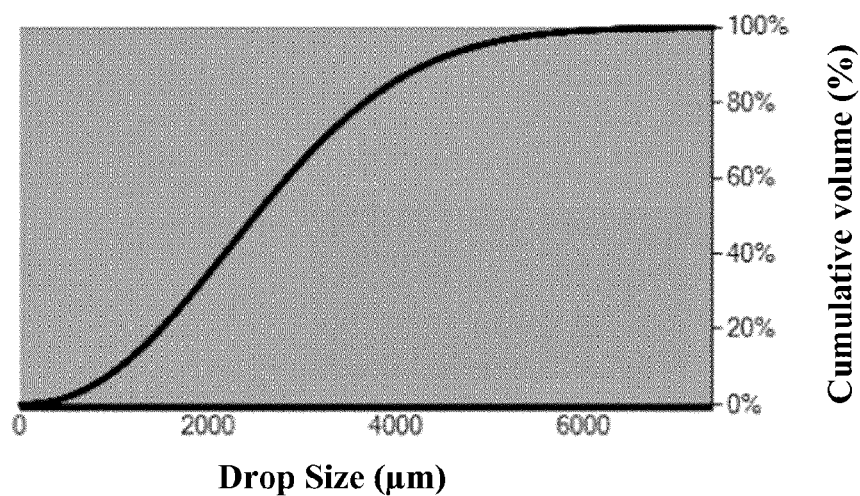
FIG. 6b shows the drop size distribution from a spiral spray device injecting 3380 liters water/minute at 2 bar pressure.

The spray devices (41, 42) can be of any kind e.g. spray nozzles comprising a plain orifice or a shaped orifice. In particular, the spray devices (41, 42) can be a surface impingement spray nozzle or a flat fan spray pattern nozzle. In particular, it is often desired to utilize spray devices comprising an impingement surface forming a spiral (spiral spray device) which generates a full cone spray pattern or a hollow-cone spray pattern. The spiral design generally produces smaller drop size than pressure swirl type nozzle design, for a given pressure and flow rate. This spiral design can also be more clogging resistant due to a larger free passage. Suitable, and often desired, spiral spray devices can provide a full cone spray with a drop size distribution as shown in FIG. 6a or 6b or smaller when injecting 2180 liters water/minute or 3380 liters water/minute respectively at 2 bar pressure.

The spray devices (41, 42) are typically configured to provide scrubber liquid droplets when being in operation wherein more than 50% of the volume of the droplets have a diameter of 0.35 mm to 4 mm, more specifically 0.5 to 2 mm, most specifically around 1 mm. As used herein, the diameter of the droplets, also called drop size is the Sauter Mean Diameter. This is the diameter of a particle whose ratio of volume to surface area is equal to that of the complete spray sample. It is defined as the cube of the Volume Mean Diameter divided by the square of the Surface Mean Diameter. The Sauter Mean Diameter is typically about 80% of the Volume Median Diameter.

As used herein, scrubber liquid droplets are scrubber liquid particles with a size sufficient to fall downwards in the spray tower during exhaust purification. The sufficient size will depend on the exhaust flow and the exhaust temperature and can be readily determined by a skilled person. Such scrubber liquid droplets will fall counter current to the general exhaust flow. Scrubber liquid droplets may evaporate to become smaller and even scrubber liquid vapour depending on several parameters like their initial size, the exhaust temperature and the exhaust flow. As used herein, scrubber liquid droplets are scrubber liquid particles with a size insufficient to fall downwards in the spray tower during exhaust purification. Thus, scrubber liquid droplets will essentially move along with the general exhaust flow. The scrubber liquid droplets may collide with each other and thus increase their size to become bigger. The injected water volume can be adjusted according to the engine load to optimize performance of the scrubber. For example, the injected water volume may be in the range of 10 000 to 15 000 litres per minute for a 10-15 meter high spray tower (1) with a diameter of about 3 meters, when purifying 30 kg exhaust per second.

The spray tower (1) according to the present application can exist out of only one scrubber chamber (13) (as can be seen in FIG. 1), but can also exist out of multiple scrubber chambers (13, 14), as can be seen in FIGS. 2 to 4. In the system as shown in FIGS. 2 to 4, two scrubber chambers (13, 14) are provided. When the spray tower (1) comprises two or more scrubber chambers (13, 14), they are partly separated from each other but also partly fluidly connected to each other by means of a connection (9). The connection (9) can for example be arranged as a coaxial constriction, conveying partly scrubbed exhaust gas from the lower scrubber chamber (13) to the upper scrubber chamber (14).

The number of spray devices (41, 42) and the direction in which they spray the scrubber liquid can vary within one scrubber chamber (13) or throughout different scrubber chambers (13, 14). In FIG. 1, in which the spray tower (1) only has one scrubber chamber (13), four spray devices (41, 42) are provided of which the upper two spray devices (41) are arranged to spray scrubber liquid in a downward direction while the lower two spray devices (42) are arranged to spray scrubber liquid in an upward direction. In FIGS. 2 to 4, the spray tower (1) has a lower and an upper scrubber chamber (13, 14). In FIG. 2, the lower scrubber chamber (13) as well as the upper scrubber chamber (14) are provided with one spray device (41) that is arranged to spray scrubber liquid in a downward direction. In FIG. 3, the lower scrubber chamber (13) as well as the upper scrubber chamber (14) has two spray devices (41, 42) of which one spray device (41) is arranged to spray scrubber liquid in a downward direction and one spray device (42) is arranged to spray scrubber liquid in an upward direction. In FIG. 4, the lower scrubber chamber (13) is provided with three spray devices (42) all arranged to spray scrubber liquid in an upward direction while the upper scrubber chamber (14) is provided with two spray devices (41) that are arranged to spray scrubber liquid in a downward direction.

The spray tower (1) can furthermore be provided with one or more deflection bodies (8) that are arranged to reduce, or in the optimal case prevent the scrubber liquid from entering the central exhaust gas pipe (7) or entering the connection (9) between the upper and the lower scrubber chamber (13, 14) or in other words the exhaust outlet from the lower scrubber chamber (13) if present. The deflection bodies (8)

can furthermore direct the exhaust towards the walls of the spray tower (1) and in this way create a turbulent gas flow. The shape of the deflection bodies (8) may also affect the backpressure and can be easily modified by a person skilled in the art accordingly. For example, the longitudinal section of the deflection bodies (8) can be roughly diamond shaped or have any other shape compatible with low backpressure. Similarly, the cross section of the deflection bodies (8) may be circular, oval or any other shape compatible with low backpressure. The deflection bodies (8) typically are placed below the spray device(s) (41, 42).

In order to drain off the used scrubber liquid out of the spray tower (1), per scrubber chamber (13, 14), a scrubber liquid outlet (5, 11) is arranged. The connection (9) between the upper and the lower scrubber chamber (13, 14) typically has a shape to take care that the used scrubber liquid is easily directed towards the scrubber liquid outlet pipe(s) (5, 11) to be drained off out of the spray tower (1). When there is one scrubber chamber (13), the scrubber liquid outlet (5) is typically placed in the bottom end (1b) of the spray tower (1) in order to optimally drain off the used scrubber liquid out of the spray tower (1). If the central exhaust gas pipe (7) passes through the bottom end (1b) of the spray tower (1), as is the case in the system as shown in FIG. 1, the scrubber liquid outlet (5) is typically placed below the proximal end (7b) of this central exhaust gas pipe (7). When the spray tower (1) has a multiplicity of scrubber chambers (13, 14), as is the case in the systems as shown in FIGS. 2 to 4, then in the lower scrubber chamber (13), the scrubber liquid outlet (5) is also placed in the bottom end (1b) of the spray tower (1), and if the central exhaust gas pipe (7) passes through the bottom end (1b) of the spray tower (1), the scrubber liquid outlet (5) is placed below the proximal end (7b) of the central exhaust gas pipe (7). In the upper chamber (14), the scrubber liquid outlet (11) is arranged in one of the side walls (1c) of the spray tower (1) above the bottom end (9b) of the connection (9) but below the open top end (9a) of this connection (9). This allows an efficient draining off of used scrubber liquid out of the upper scrubber chamber (14).

The spray tower may optionally comprise a droplet separator (not shown on the figures) able to prevent scrubber liquid droplets from leaving the spray tower (1) along with the purified exhaust gas. The droplet separator can be mounted close to the exhaust gas outlet (3).

Tests with a system according to the application as shown in FIG. 4, having a spray tower (1) with a height of 12 meter, have demonstrated that exhaust gas from fuel oil comprising 3,3 w/w % of sulfur was purified to contain only 5 to 8 ppm $SO_2$. These test results were obtained when the exhaust gas temperature in the central exhaust gas pipe (7) was up to 280° C. and the temperature of the purified exhaust gas leaving the spray tower (1) at the exhaust gas outlet (3) was about 40° C.

The invention claimed is:

1. A marine exhaust gas cleaning system for reducing the amount of $SO_x$ in exhaust gas from marine engines, comprising
    a) a spray tower (1) arranged to be vertically positioned and having an inner space (100), wherein the spray tower (1) comprises,
        1) a central exhaust gas pipe (7) in fluid connection with the inner space (100) of the spray tower (1) through an exhaust gas inlet (2) positioned at a proximal end (7b) of the central exhaust gas pipe (7) arranged for introducing exhaust gas into the inner space (100), wherein said central exhaust gas pipe (7) is positioned at a bottom end (1a) of the spray tower (1) in installed position; and
        2) at least one exhaust gas outlet (3) in fluid connection with, the inner space (100) of the spray tower (1) arranged for withdrawing purified exhaust gas from the inner space (100), wherein said exhaust gas outlet (3) is positioned at a top end (1b) of the spray tower (1) in installed position,
        wherein from the exhaust gas inlet (2) to the exhaust gas outlet (3), a general exhaust gas flow is passing through the inner space (100) of the spray tower; and
        3) at least one scrubber liquid outlet (5) arranged to drain off the scrubber liquid out from the spray tower (1);
    b) one or more spray devices (41, 42) configured to provide a stream of scrubber liquid within the inner space (100) of the spray tower (1) counter current to the general exhaust gas flow;
characterized in that at least two engine exhaust gas pipes (6) are connected to the distal end (7a) of the central exhaust gas pipe (7).

2. A system according to claim 1, wherein the stream of scrubber liquid is fresh water, salt water or an alkaline aqueous solution.

3. A system according to claim 1, wherein the one or more spray devices (41, 42) are configured to provide scrubber liquid droplets when being in operation, wherein more than 50% of the volume of the droplets have a diameter of 0.35 mm to 4 mm.

4. A system according to claim 1, wherein all spray devices (42) are arranged to spray the scrubber liquid upwards or all spray devices (41) are arranged to spray the scrubber liquid downwards.

5. A system according to claim 1, wherein part of the spray devices (42) are arranged to spray the scrubber liquid upwards and part of the spray devices (41) are arranged to spray the scrubber liquid downwards.

6. A system according to claim 1, wherein
    the central exhaust gas pipe (7) passes through the bottom end (1a) of the spray tower (1) and extends into the inner space (100) of the spray tower (1); and
    the scrubber liquid outlet (5) is positioned below the proximal end (7b) of the central exhaust gas pipe (7).

7. A system according to claim 1, wherein the spray tower (1) comprises at least one deflection body (8) reducing or preventing used scrubber liquid from entering the central exhaust gas pipe (7).

8. A system according to claim 1, wherein the system comprises a single spray tower (1).

9. A system according to claim 1, wherein each of the engine exhaust gas pipes (6) comprises an exhaust gas valve (15) arranged to prevent backflow of the exhaust gas into the exhaust gas pipes (6) when the exhaust gas valve (15) is closed.

10. A system according to claim 1, wherein each of the engine exhaust gas pipes (6) are arranged to be connected to a separate engine to convey the exhaust gas from each of the single engines to the central exhaust gas pipe (7).

11. A system according to claim 1, wherein the spray tower (1) comprises an upper (14) and a lower scrubber chamber (13) fluidly connected to each other, wherein
    a) both scrubber chambers (13, 14) comprise at least one spray device (41) configured to provide a stream of scrubber liquid counter current to the general exhaust gas flow through each of the scrubber chambers (13, 14);

b) the upper scrubber chamber (14) comprises at least one deflection body (8) located below the spray device (41, 42) situated lowest in the upper scrubber chamber (14), and configured to prevent scrubber liquid from entering the lower scrubber chamber (13);
c) the upper scrubber chamber (14) comprises at least one scrubber liquid outlet (11) arranged to drain off the used scrubber liquid out of the upper scrubber chamber (14);
d) the lower scrubber chamber (13) comprises at least one deflection body (8) located below the spray device (41, 42) situated lowest in the lower scrubber chamber (13), and configured to prevent scrubber liquid from entering the central exhaust gas pipe (7);
e) the lower scrubber chamber (13) comprises at least one scrubber liquid outlet (5) arranged to drain off the used scrubber liquid out of the lower scrubber chamber (13).

12. A system according to claim 11, wherein the spray devices (41) in the upper chamber (14) are arranged to spray the scrubber liquid downwards and the spray devices (42) in the lower chamber (13) are arranged to spray the scrubber liquid upwards.

13. A marine vessel comprising a system according to claim 1.

14. A method for purifying exhaust gas from at least two engines, located in a marine vessel, by reducing the amount of $SO_x$ in the exhaust gas, the method comprising the steps of:
  a) conveying exhaust gas from the engines via two or more engine exhaust gas pipes (6) to the distal end of a central exhaust gas pipe (7) arranged for introducing exhaust gas into the inner space (100) of a spray tower (1) through an exhaust gas inlet (2) positioned at the proximal end (7b) of the central exhaust gas pipe (7), the central exhaust gas pipe (7) being located at a bottom end (1a) of a vertically positioned spray tower (1), the two or more engine exhaust gas pipes (6) being arranged for introducing exhaust gas into the distal end (7a) of the central exhaust gas pipe (7);
  b) generating a general exhaust gas flow from the exhaust gas inlet (2) to an exhaust gas outlet (3), for withdrawing purified exhaust gas out from the spray tower (1), said exhaust gas outlet (3) located at a top end (1b) of the spray tower (1),
  c) injecting scrubber liquid into the spray tower (1) using one or more spray devices (41, 42), thereby providing a stream of scrubber liquid counter current to the general exhaust gas flow.

15. The method according to claim 14 wherein the scrubber liquid is fresh water, salt water or an alkaline aqueous solution.

16. A method according to claim 14 using a marine exhaust gas cleaning system for reducing the amount of $SO_x$ in exhaust gas from marine engines, comprising
  a spray tower (1) arranged to be vertically positioned and having an inner space (100), wherein the spray tower (1) comprises,
    1) a central exhaust gas pipe (7) in fluid connection with the inner space (100) of the spray tower (1) through an exhaust gas inlet (2) positioned at a proximal end (7b) of the central exhaust gas pipe (7) arranged for introducing exhaust gas into the inner space (100), wherein said central exhaust gas pipe (7) is positioned at a bottom end (1a) of the spray tower (1) in installed position; and
    2) at least one exhaust gas outlet (3) in fluid connection with, the inner space (100) of the spray tower (1) arranged for withdrawing purified exhaust gas from the inner space (100), wherein said exhaust gas outlet (3) is positioned at a top end (1b) of the spray tower (1) in installed position,
    wherein from the exhaust gas inlet (2) to the exhaust gas outlet (3), a general exhaust gas flow is passing through the inner space (100) of the spray tower; and
    3) at least one scrubber liquid outlet (5) arranged to drain off the scrubber liquid out from the spray tower (1);
  one or more spray devices (41, 42) configured to provide a stream of scrubber liquid within the inner space (100) of the spray tower (1) counter current to the general exhaust gas flow;
characterized in that at least two engine exhaust gas pipes (6) are connected with the distal end (7a) of the central exhaust gas pipe (7).

* * * * *